US005818020A

United States Patent [19]

Kabacaoglu et al.

[11] Patent Number: 5,818,020

[45] Date of Patent: Oct. 6, 1998

[54] USER INTERFACE FOR A POSTAGE METER MACHINE

[75] Inventors: Hasbi Kabacaoglu; Claus Freytag; Norbert Knoth, all of Berlin; Thomas Epping, Griesheim/Hess; Wolfgang Von Inten, Berlin, all of Germany

[73] Assignee: Francotyp-Postalia AG & Co., Birkenwerder, Germany

[21] Appl. No.: 575,217

[22] Filed: Dec. 20, 1995

[30] Foreign Application Priority Data

Dec. 21, 1994 [EP] European Pat. Off. .............. 94120314

[51] Int. Cl.[6] ...................................................... G06F 15/30

[52] U.S. Cl. ............................................ 235/378; 235/378

[58] Field of Search ..................................... 235/378, 379; 364/464.02, 464.03; 705/401

[56] References Cited

U.S. PATENT DOCUMENTS 5,134,567 7/1992 Haug .................................. 364/464.02
5,161,108 11/1992 Haug .................................. 364/464.02
5,471,925 12/1995 Heinrich et al. .......................... 101/91
5,600,562 2/1997 Guenther ................................ 705/401

FOREIGN PATENT DOCUMENTS 0 492 439 7/1992 European Pat. Off. .
0 496 575 7/1992 European Pat. Off. .
0 571 061 11/1993 European Pat. Off. .

*Primary Examiner*—Donald T. Hajec
*Assistant Examiner*—Karl Frech
*Attorney, Agent, or Firm*—Hill & Simpson

[57] ABSTRACT

A user interface for a postage meter machine has a number of menu images which are available for display on a single display unit, the menu images containing internally generated and externally entered information, the menu images containing fields in which the information is contained and displayed, these fields being spatially allocated to input elements of the input unit. The setting of the fields in the menu images is variable, i.e., the limits or boundaries of the individual fields can be varied from menu image to menu image, so that the field size can be flexibly matched to the information to be displayed.

21 Claims, 11 Drawing Sheets

FIG. 2
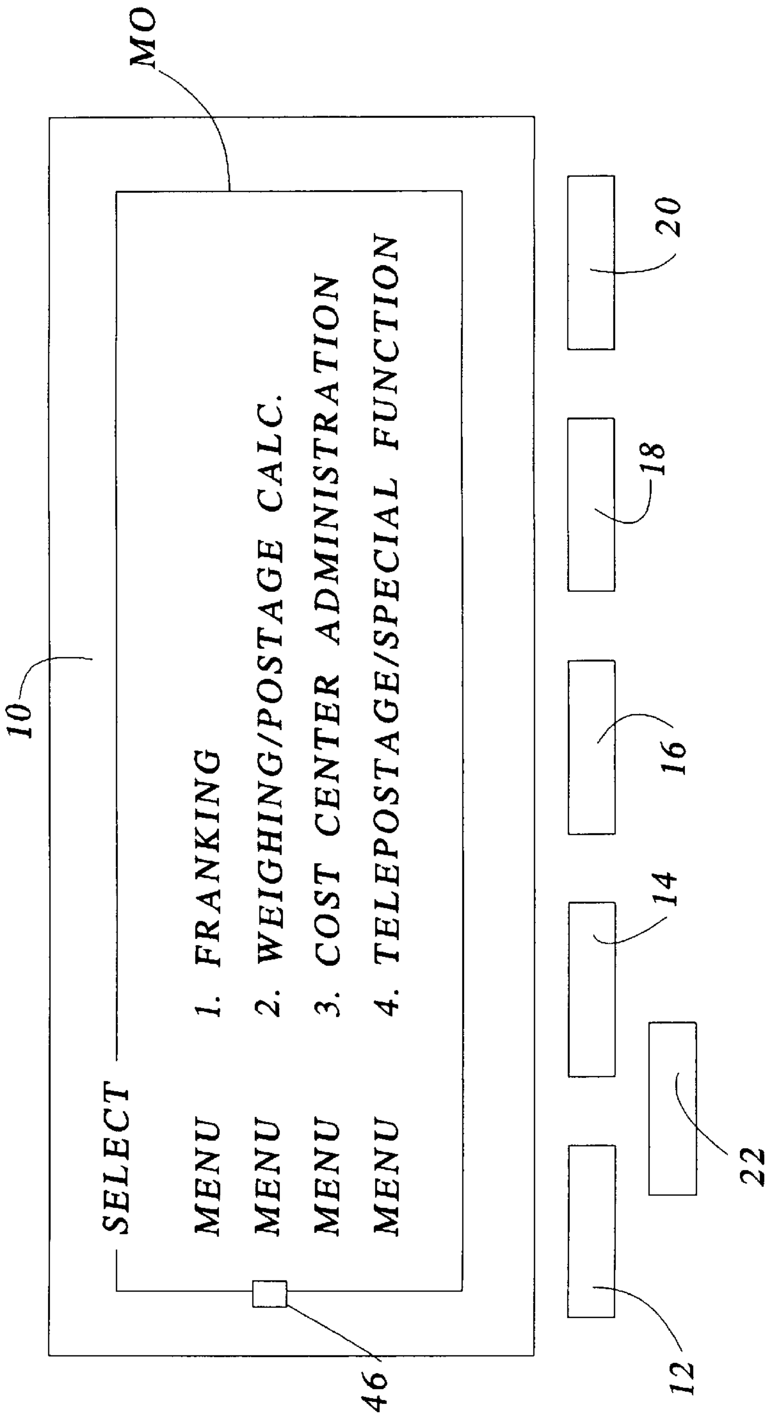
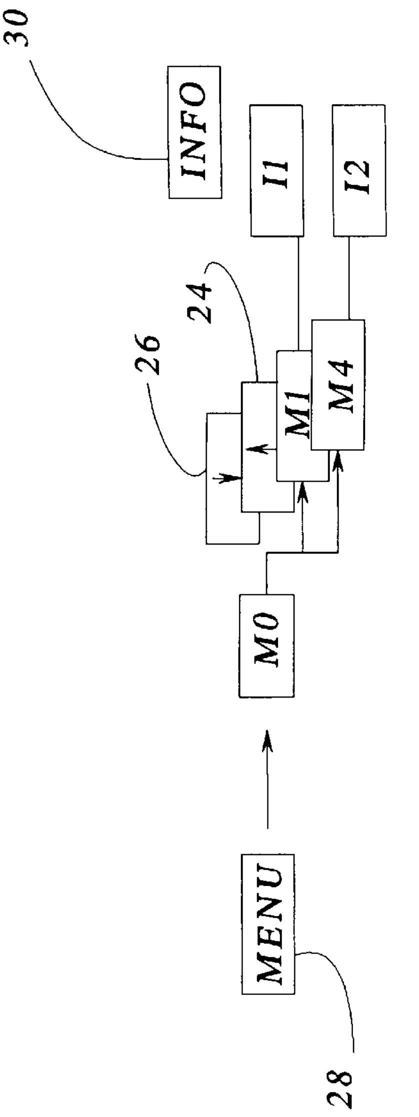
FIG. 3

USER INTERFACE FOR A POSTAGE METER MACHINE

BACKGROUND OF THE INVENTION

1. Field of the Invention

The present invention is directed to a user interface for a postage meter machine of the type having an input unit with input elements for entering display and control information, a display unit for displaying internally generated and externally entered information, a controller for controlling the functions of the postage meter machine, the acceptance of the entered information as well as the functions of the display unit, and having a memory in which a plurality of menu images that are subdivided into fields and can be displayed on the display unit are stored, whereby the controller causes that a menu image, stored in the memory whose fields are spatially allocated to input elements to be displayed on the display unit.

DESCRIPTION OF THE PRIOR ART

European Application 0 492 439 discloses a microprocessor-controlled user interface that uses two display units. Menu images whose respective fields have fixed, predetermined field limits are displayed on a first display unit. Only the text or the graphic presentation is modified within these fields from menu image to menu image. Input keys are arranged in the line direction of the first display unit, these being respectively allocated to a specific field in the line direction. Operating parameters for the operation of the postage meter machine can be entered via the input keys. As a menu image, the second display unit shows the franking stamp image that is printed on the postal matter by the postage meter machine. This menu image also has fixed, subdivided fields to which input keys are allocated and via which information for the franking image, for example the date and the postage value, can be entered.

A disadvantage of this known user interface is that considerable space is used due to the employment of a plurality of display units, a large number of input keys are required due to the fixed allocation of input keys to the fields of the various menu images, and the programming of the information to be presented on the display units is difficult since the fixed field limits must be respectively taken into consideration in the definition of the text and graphic elements. The user of the known user interface also needs substantial dexterity in order to select the correct setting from the multitude of input possibilities offered to him or her in parallel and from the graphic presentations and to operate the postage meter machine. Accordingly, the time expenditure for operating the user interface is high and the risk of an incorrect input is high. Further, substantial training time is required in order to correctly operate the user interface.

SUMMARY OF THE INVENTION

An object of the present invention is to provide a user interface for a postage meter machine that informs the operator of the requested information in a simple way, which is easy and comfortable to operate, and which has a low space requirement.

In a known user interface of the type initially described, this object is achieved by providing that all menu images can be displayed on a single display unit, and by providing that the setting of the menu images in fields is variable.

Differing from the prior art, the division of the menu images is not fixed in the invention but variable, i.e. the limits of the individual fields can be varied from menu image to menu image. As a result, it becomes possible to flexibly match the field size to the information to be displayed. All necessary information can be communicated to the user without having to take predetermined field limits into consideration. The user interface of the invention is therefore extremely user-friendly and enables a short training time. As a result of the variable division of the menu images that are displayed on a single display unit, it becomes possible to reduce the space required for the user interface. Moreover, the user interface remains surveyable since the operator need not simultaneously observe a number of display units. Further, the programming of the menu image to be displayed is simple and the designed freedom is increased, since the definition of text elements and/or graphics elements within the program windows determined by the fields is not limited.

In an embodiment of the invention a postage stamp (franking imprint) menu image contains fields with text and graphics elements whose arrangement in the menu image is geometrically similar or identical to the actual stamp image. The advantages of the invention are especially prominent in the display of the franking imprint. As a result of the variable field limits, the arrangement of text and graphics elements can ensue based closely on the geometry of the actual imprint. User prompting is thereby further facilitated and the risk of a misoperation is reduced.

In another embodiment, at least one software key of the input unit is spatially permanently allocated to each field that contains an input request. The function allocated to a soft key, as is known, can be determined by a control program, so that the function initiated with one and the same soft key can vary from menu image to menu image. Due to the fixed, spatial allocation of the soft key to a specific field, whereby the soft keys are preferably virtually arranged under the fields of the display unit, the number of required soft keys is reduced, and thus the surveyability of the user interface is enhanced and the user-friendly prompting by the menu images is further improved.

The field with an input request preferably contains an optical identifier that indicates a specific soft key. The optical identifier, for example, can be a bar or limiting elements of a text element which indicates the control information to be modified. As a result of the optical identifier, the operator is directed to the proper soft key, so that the operation can be easily learned by the operator despite the variable field division of the menu images. For example, the centroid of the surface of the optical identifier in the direction of the vertical of the display unit can approximately align with the centroid of the surface of the associated soft key. When observing the menu image, the operator immediately recognizes the spatial relationship of the field and the associated soft key and can then undertake the entry of information.

A further facilitation of the user prompting by the user interface of the invention is achieved when, upon actuation of the soft key, the field allocated thereto is optically emphasized. This can occur by inverting the entire field or inverting only the displayed, variable information. Further, the field can be framed or a flashing display can ensue.

After the actuation of the soft key in an exemplary embodiment of the invention, input keys fashioned as hard keys are actuated with which scroll functions and/or toggle functions are triggered for information entry. Alternatively, numerical values can be entered using number keys. The information input with the input keys only become valid upon actuation of a further actuation key fashioned as a hard key. If the user does not wish to employ the entered information, then he or she merely has to change the menu image or actuate a further soft key that is allocated to a different field. In this exemplary embodiment, thus, a function selection ensues first within a menu image by actuation of a soft key, followed by a data entry, and an acknowledgement by the actuation key in conclusion. A fast data entry while simultaneously avoiding erroneous inputs is achieved by this defined sequence in operation.

In another exemplary embodiment the input field contains a setting key, the actuation of which activities a program in the controller is that stores the values entered via input keys at predetermined menu images for a specific franking event and allocates these to a predetermined parameter retrieve key. Upon actuation thereof, the controller then automatically controls the operation of the postage meter machine taking these values into consideration. Data required for franking events that repeat frequently can be retrieved quickly in this way by actuating the parameter retrieve key; the operator need not compile the data via the various menu images. The compilation of the data ensues with data inputs controlled via menu images in the fashion of a training program. The training program is started by actuation of the setting key and is ended with actuation of the parameter retrieve key, whereby the input values are stored in a non-volatile memory and can thus be quickly retrieved for identical franking events. Of course, it is possible to provide a number of parameter retrieve keys that are allocated to specific, frequently recurring franking functions.

DESCRIPTION OF THE DRAWINGS

FIG. 2 illustrates the output menu image of the inventive interface.

FIG. 3 is a schematic illustration of the sequence steps with which a branch can be made from the output menu image to basic menu images and back to the output menu image in the inventive interface.

DESCRIPTION OF THE PREFERRED EMBODIMENTS

Figure 1:
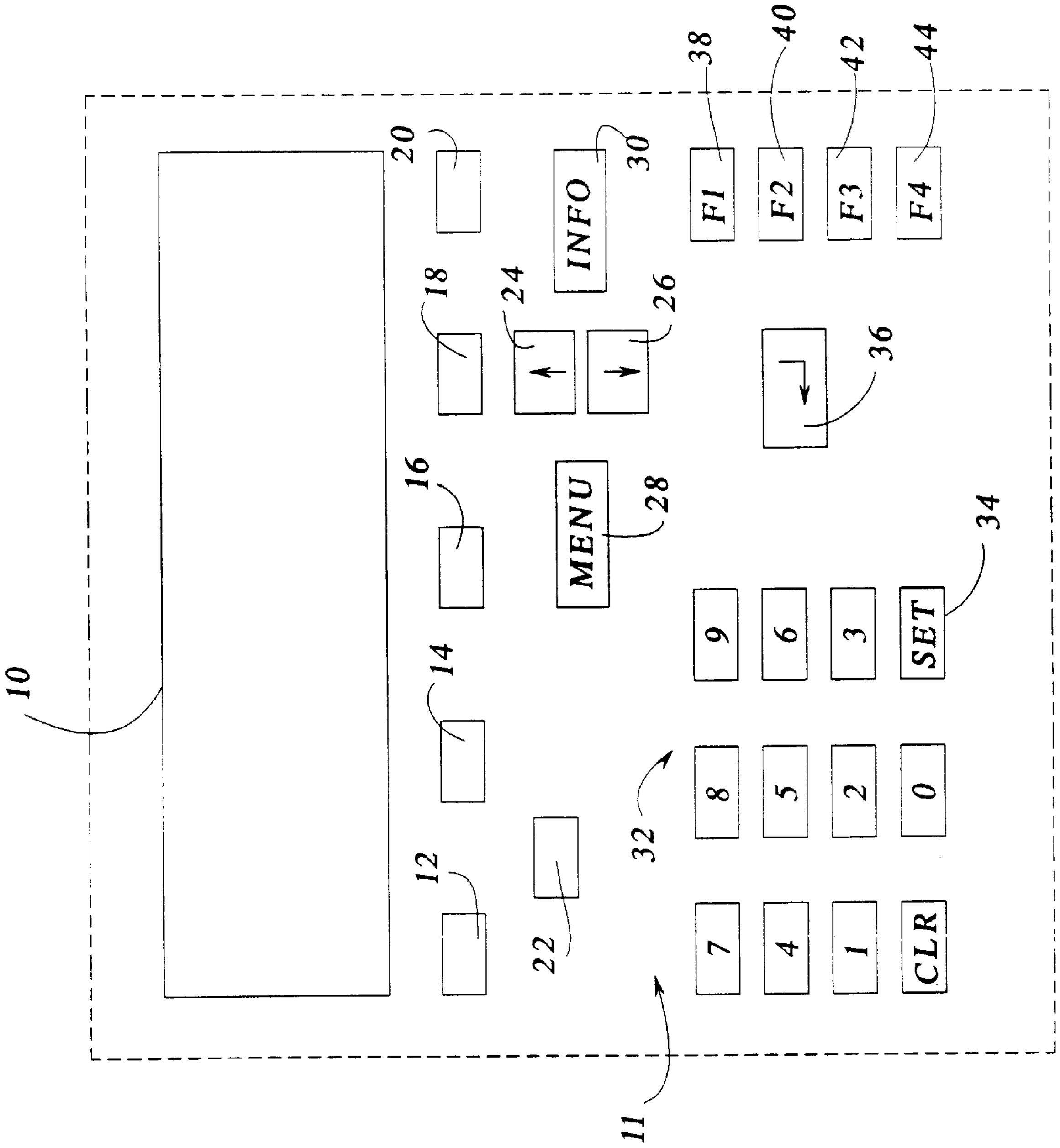
FIG. 1 is a schematic illustration of the display unit and the input unit of the user interface of the invention.

FIG. 1 shows the user interface presented to the operator having a display unit 10 below which six soft keys 12–22 are arranged. Scrolling can be carried out within the menu image displayed on the display unit 10 with two scroll keys 24 and 26, i.e., a cursor can be advanced line-by-line within a field or the image content of a field can be shifted up or down. A menu key 28 is provided next to the scroll keys 24 and 26; an immediate return can be made to an initial menu image with this menu key 28 from an arbitrary basic menu image or information menu image displayed on the display unit 10, as shall be set forth in greater detail later. An INFO key 30 allows the user of the user interface to retrieve information menu images from specific menu images.

Parameter retrieve keys 38–44 are also provided, the actuation of which cause the controller to control the operation of the postage meter machine taking previously stored values into consideration. The retrieve keys 38–44 are labeled F1–F4 in order to identify various franking functions.

An actuation key 26, the actuation of which causes data entered to be acknowledged, is located roughly in the middle of the overall input field 11. A numerical keyboard 32 is arranged at the left in FIG. 1. The numerical keyboard 32 is optically supplemented to form a square with a setting key 34, the actuation of which activates a program with which values are stored that can be quickly retrieved by actuating the retrieve keys 38–44.

A LCD module whose picture elements are arranged in the fashion of a matrix is provided as the display unit 10. For example, the LCD module can contain 240×64 picture elements, so that a high resolution is possible even given a graphic display.

FIG. 2 shows the initial menu image MO displayed on the display unit 10 proceeding from which a branch can be made to basic menu images M1–M4. A cursor mark 46 is shown in the left part of the image of the initial menu that indicates a line of the initial menu that is allocated to a basic menu M1–M4. The cursor 46 can be moved up or down line-by-line by actuating the scroll keys 24 and 26. Upon actuation of the actuation key 36, a branch is made from the initial menu image MO to one of the basic menu images M1–M4 selected by the cursor 46, to the basic menu image M2 in the illustrated example. The soft keys 12–22 have no significance in the display of the initial menu image MO.

FIG. 3 schematically shows the procedures when changing from one menu image to another. Upon actuation of the menu key 28, a return to the initial menu image MO is made from the menu image displayed at the moment which can be a basic menu image M1–M4 or an information menu image 11 or 12. A branch can be made to one of the basic menu images M1–M4 from this initial menu image M0 by actuation of the scroll keys 24 and 26 and termination by the actuation key 36. By actuating the INFO key 30, for example, a branch can be made from the basic menu images M1 and M4 to information menu image 11 or 12.

Figure 4:
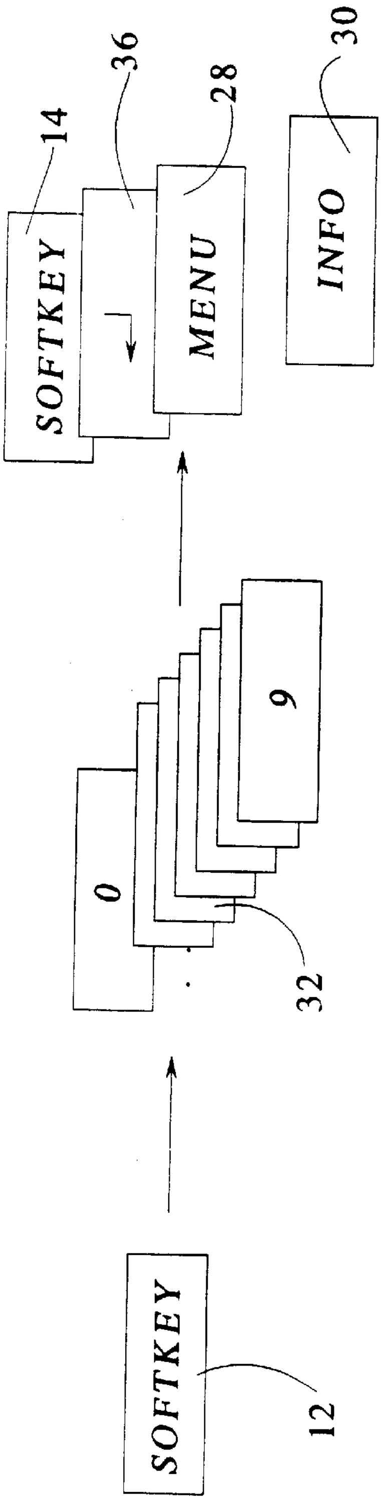
FIG. 4 schematically illustrates the sequence upon entry of data for a basic menu image in the inventive interface.

FIG. 4 shows input possibilities in conjunction with the actuation of a soft key. If a field of a basic menu image contains an input request, then the operator is prompted to a specific soft key 12 on the basis of the optical identifier in the appertaining field, as set forth in greater detail later. Upon actuation of the soft key 12, a numerical value can be subsequently entered via the numerical keyboard 32, this numerical value being generally displayed to the operator by the controller on the appertaining basic menu image for checking. The operator now has two possibilities: First, the operator can declare the input value to be valid; to this end, the actuation key 36 is actuated and the controller uses the newly set value upon the implementation of franking events. Second, the operator can declare the input value to be invalid. To this end, for example, the operator can actuate a different soft key 14 or change to a different menu image via the menu key 28 or the INFO key 30. The input value is then not considered as new operating parameter by the controller.

Figure 5:
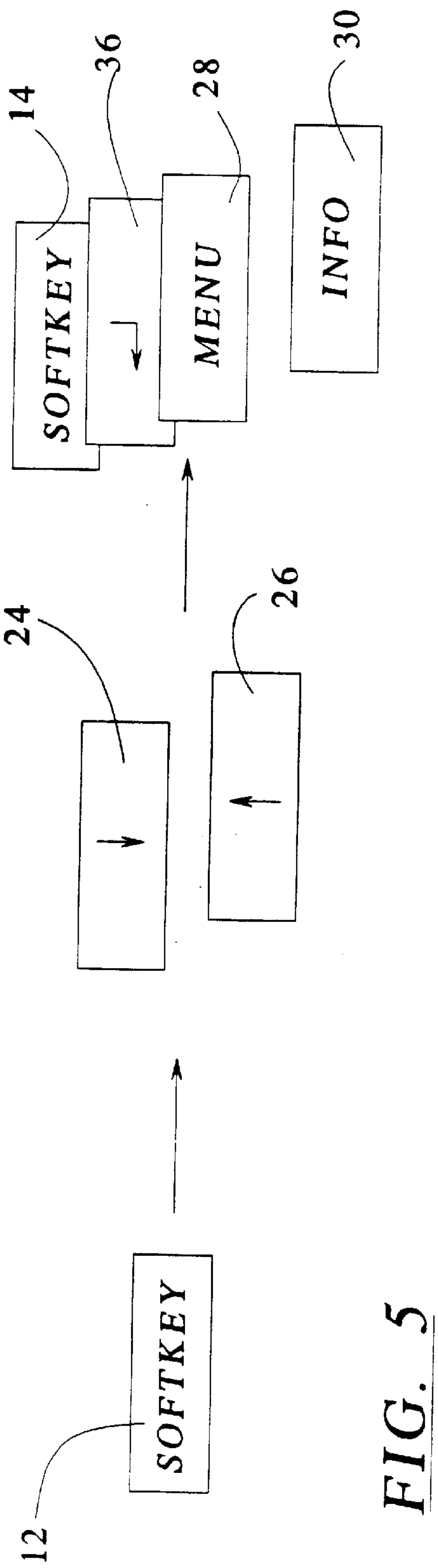
FIG. 5 illustrates the sequence for entry of data via scroll keys in the inventive interface.

FIG. 5 shows a further input possibility. After the actuation of the soft key 12, the scroll keys 24 and 26 are activated by the controller. Proceeding from a displayed, standard value, this value can be lowered step-by-step by actuating the scroll key 24 or can be raised by actuating the scroll key 26 until the suitable value has been found. Transferring the value into the controller or, respectively, the declaration of invalidity ensues as in the example of FIG. 4.

Figure 6:
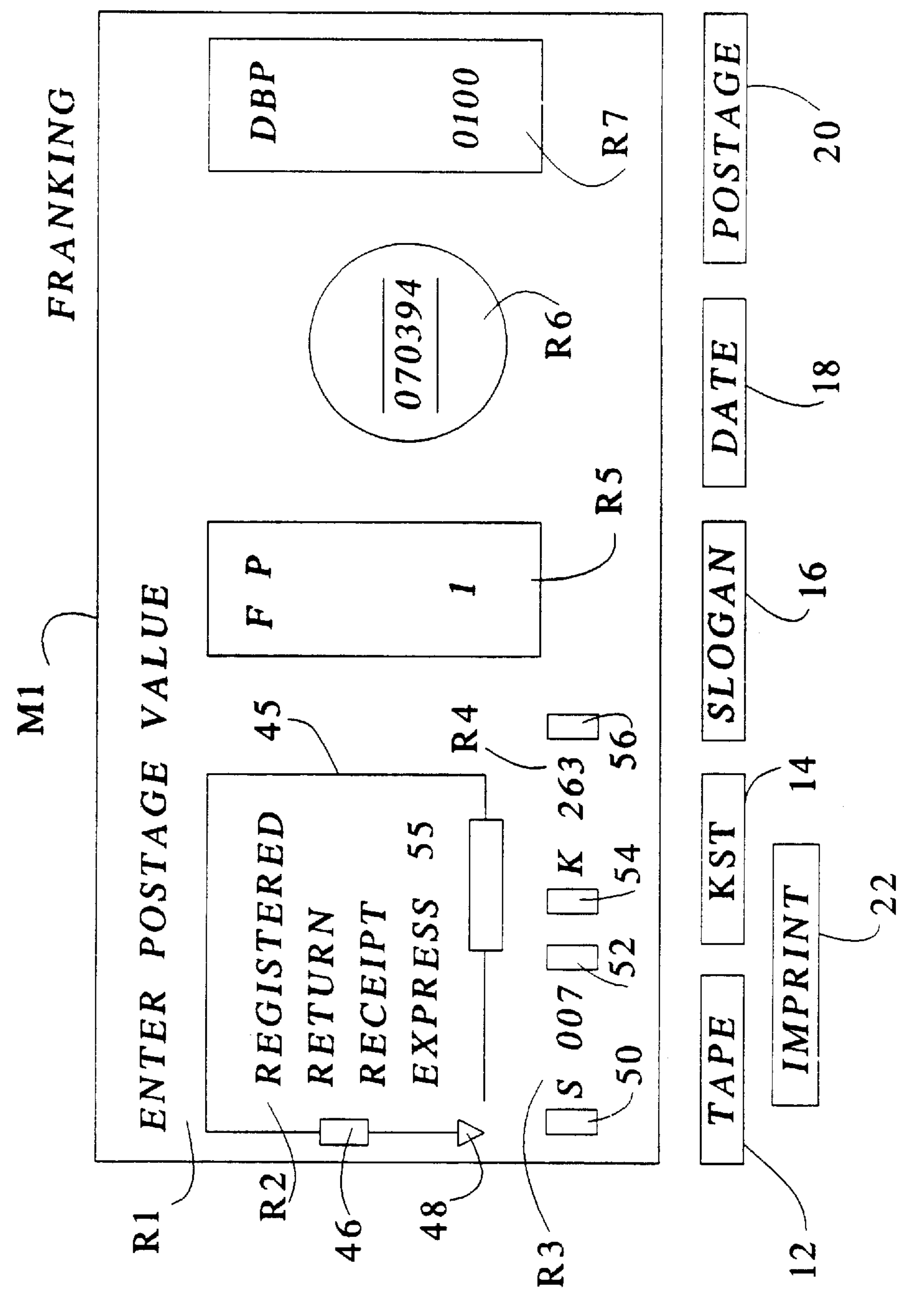
FIG. 6 shows the franking imprint menu image with various fields to which respective soft keys are allocated in the inventive interface.

FIG. 6 shows the franking imprint menu image as a basic menu image M1. Its structure at the right in the basic menu image M1 is geometrically similar to the actual imprint that the printer of the postage meter machine prints on the postal matter. The basic menu image M1 contains various fields R1–R7. The field R1 contains a text with which the operator is prompted to select or enter franking parameters. The field R2 contains text elements and graphics elements, for example a frame 45. A cursor 46 can be shifted line-by-line along a vertical side of the frame 45 when one of the scroll keys 24 or 26 is actuated. Further, the field R2 contains a display in the form of an arrow 48 that indicates that further text elements that have not yet been displayed are present and that can be retrieved little by little by actuating the scroll key 26. The field R2 also contains an optical identifier in the form of a bar 55. This bar 55 has a surface centroid that corresponds with the soft key 20 in the direction of the vertical. Upon actuation of the soft key 20, the operator can undertake an information entry for the selective imprint for the field R2 and can define what text is to be printed in the franking imprint, for example "registered," "return receipt" or "special delivery," etc. For setting the respective text element, the operator—as mentioned—actuates the scroll keys 24 or 26. When the field R2 is selected by actuating the soft key 20, it is optically emphasized, for example by means of the bar 55 flashing or the area within the frame 45 being inverted chromatically or black/white. The operator thus immediately recognizes that the controller expects an input for the field R2.

The field R4 is also fashioned as an input field and has two frame elements 54 and 56 that geometrically correspond to the soft key 14. By actuating the soft key 14, the cost center number can be entered via the numerical key board 32. The field R5 references an advertising slogan. This field R5 contains no additional optical identifier since the operator can immediately recognize that this field R5 is allocated to the soft key 16 in the vertical direction. One of several stored advertising slogans can be selected by actuating the soft key 16.

The two fields R6 and R7 respectively contain information about the date stamp and the franking value. The soft keys 18 and 20 are respectively allocated to these fields R6 and R7 and the date or the postage value can be entered upon actuation thereof.

Figure 7:
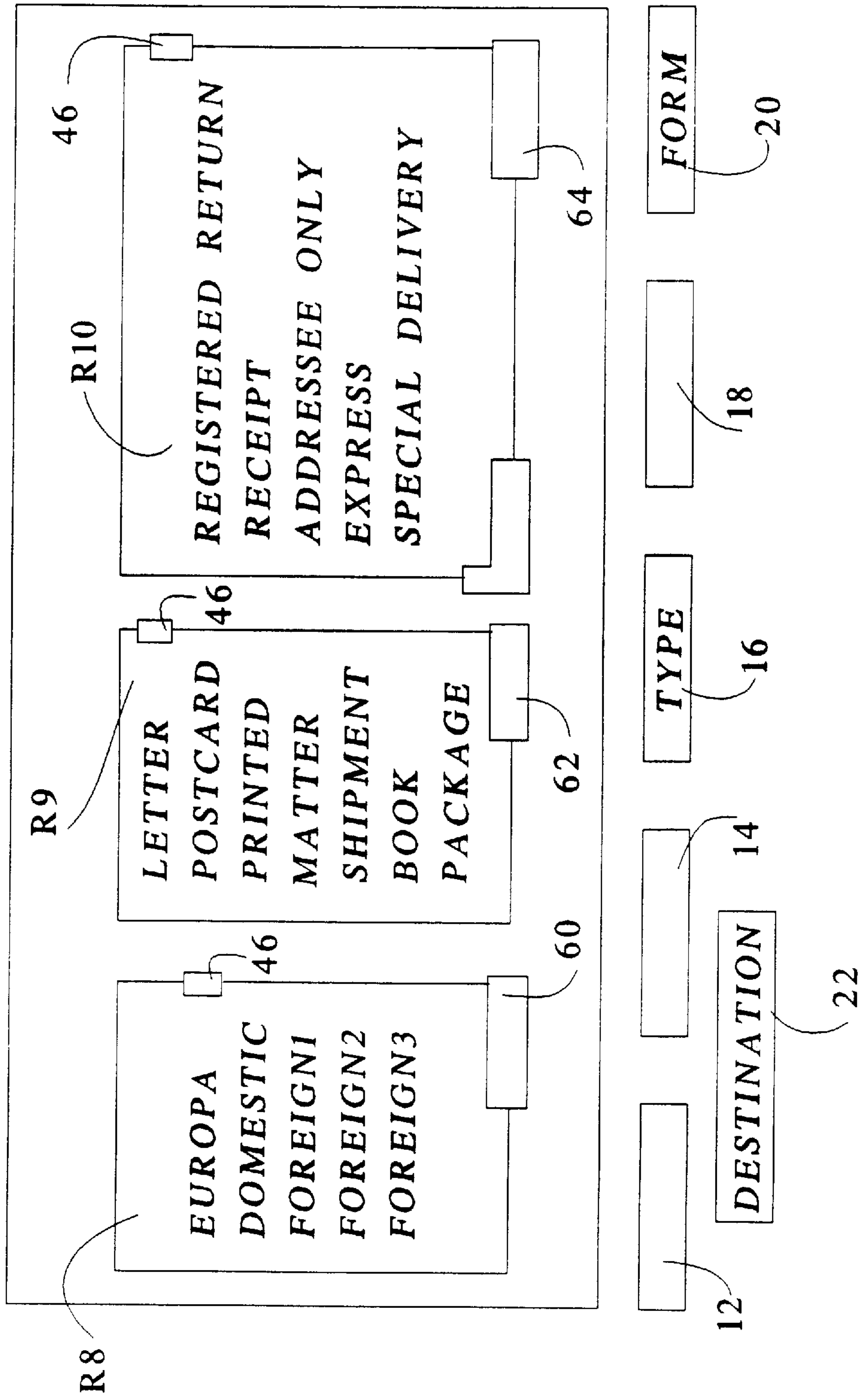
FIG. 7 shows a further basic menu image with optical identifiers and soft keys allocated thereto in the inventive interface.

FIG. 7 shows the basic menu image M2 that prompts the user given the function "weigh and calculate postage". The basic menu image M2 contains three fields R8, R9 and R10 that are each provided with a graphic frame. Each field R8, R9 and R10 contains the setting mark 46 which indicates a specific franking parameter by actuating the scroll keys 24 and 26. The field R8 contains a bar 60 as optical identifier that is geometrically vertically aligned with the soft key 20 and thus serves as an indicator for it. By actuating the soft key 20, one of a number of items indicated in the field R8 can be selected. Since no further functions are provided for the soft keys 12 or 14, it is also possible to connect this parallel to the soft key 20, so that the field R8 for the input is selected when one of the soft keys 12, 14 or 20 is pressed. Upon selection of the field R8, this is specifically identified by flashing, inversion, etc., so that it is optically distinguished from the other fields R9 and R10.

The field R9 likewise contains a bar 62 that indicates the soft key 16. Upon actuation thereof, the type of postal matter to be franked can be entered via the scroll keys 24 and 26.

The field R10 contains the bar 64 that indicates the soft key 22. By actuating the soft key 20, the field R10 is activated and it is possible to move the setting mark 46 to one of the input lines and thereby to define the desired franking form.

As a comparison of FIG. 6 to FIG. 7 (and the other figures yet to be described) shows, no fixed mask is employed for the fields R1–R10 given the basic menu images M1 and M2 that are employed. On the contrary, the various fields R1–R10 wherein an editing function can ensue within predetermined windows have no fixed field limits. The coordinates of the fields R1–R10 are defined dependent on the informational content, as a result of which an optimum user prompting is achieved. The soft keys 12–22 allocated to the input fields R1–R10 are marked by optical identifiers, so that the operator immediately recognizes the geometrical allocation of soft key to the corresponding input field R1–R10.

Figure 8:
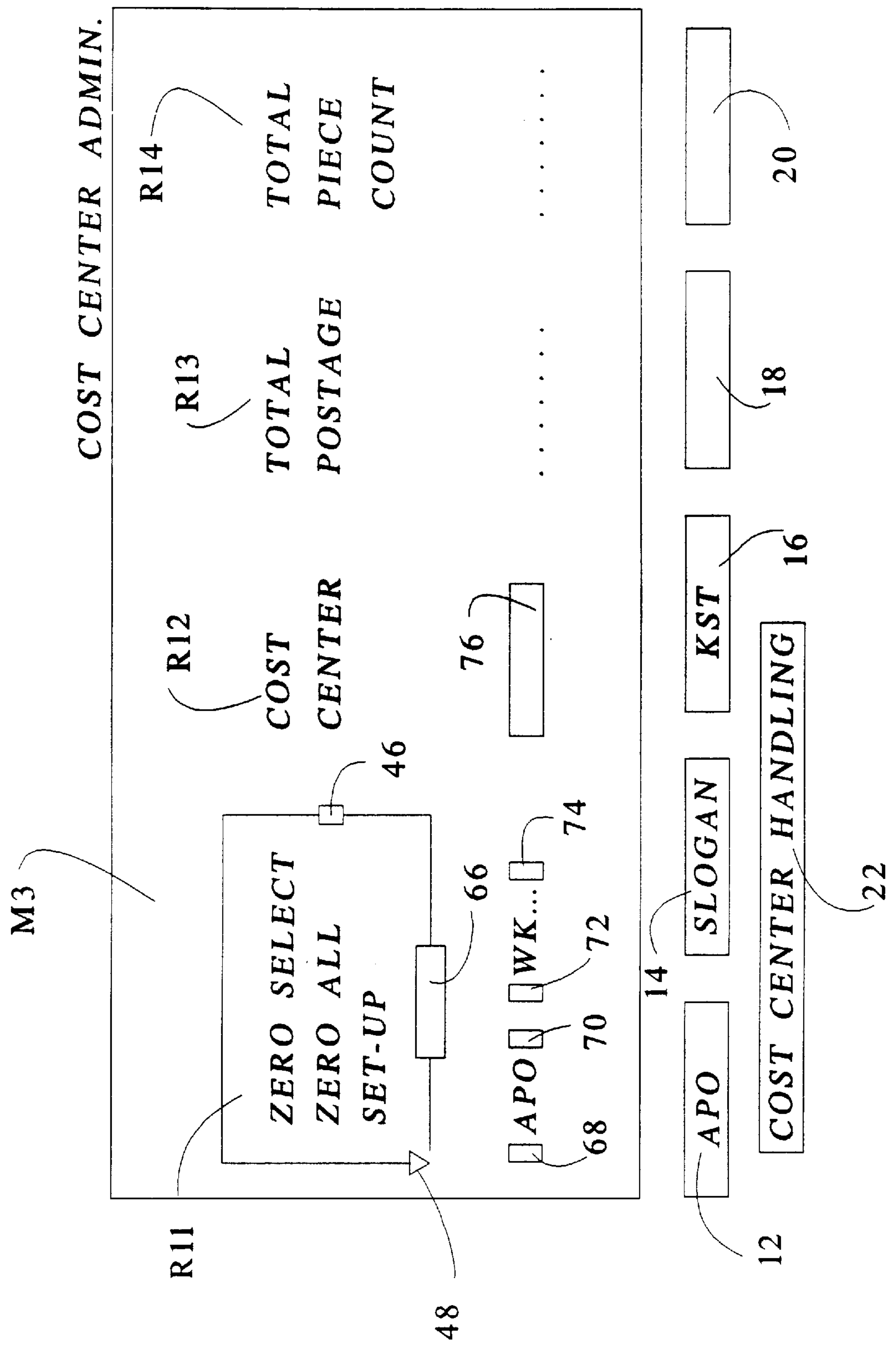
FIG. 8 shows the basic menu image for cost center administration in the inventive interface.

FIG. 8 shows the basic menu image M3 that serves the purpose of cost center administration. A field R11 serves for selecting individual cost centers. A bar 66 indicates the soft key 22 the actuation of which causes the field R11 to be activated. Edge elements 68, 70 and 72, 74 respectively, indicate the soft keys 12 and 14. By actuating the soft key 12, an identification number that serves the purpose of authorizing a user can be entered via the numerical keyboard 32. The appropriate advertising slogan is set by actuating the soft key 14.

The field R12 indicates the cost center. The associated bar 76 optically conveys the close connection between the field R12 and the soft key 16 to the operator. By actuating the soft key 16, the field R12 is activated and a specific cost center can be selected.

The fields R13 and R14 serve the purpose of reproducing cost center information. These fields R13 and R14 are input fields but are only display fields. The soft keys 18 and 20 arranged under the fields R13 and R14 have no function in this example.

Figure 9:
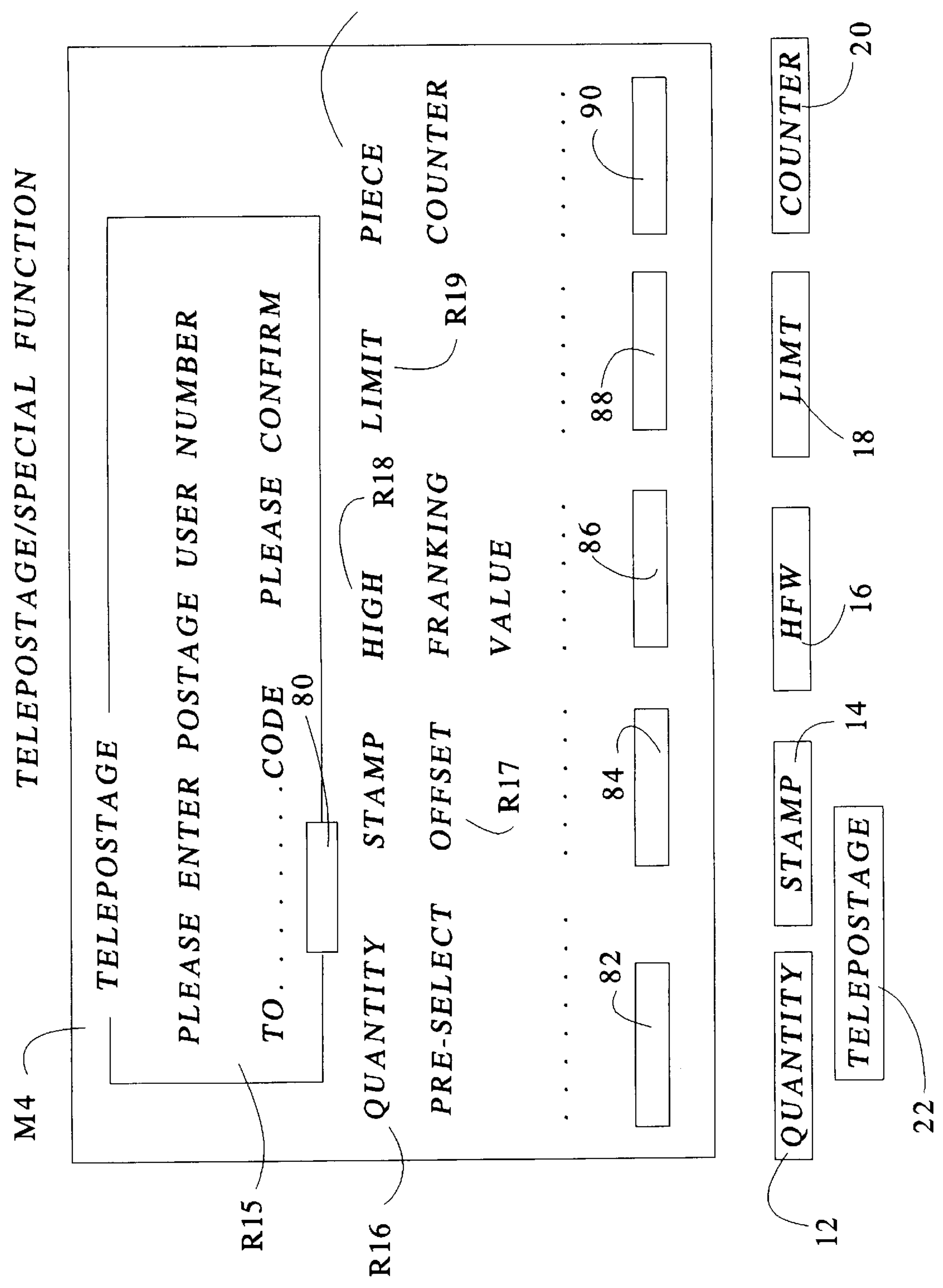
FIG. 9 shows the basic menu image for the function of remote prescription of postage in the inventive interface.

FIG. 9 shows the basic menu image M4 which relates to the remote value setting. A framed field R15 prompts the user to enter the postage fetch number in case a remote value setting is desired. The field R15 contains a bar 80 as an optical identifier that indicates the soft key 22. By actuating the soft key 22, the field Ri 5 is activated and the further fields R16, R17, R18, R19 and R20 can be subsequently addressed. Bars 82–90 that respectively indicate soft keys 12–20 are allocated to these fields R16–R20. The settings addressed in the fields R16–R20 can be undertaken by actuating respective soft keys 12–20 in conjunction with the numerical keyboard 32 or the scroll keys 24 and 26.

Figure 10:
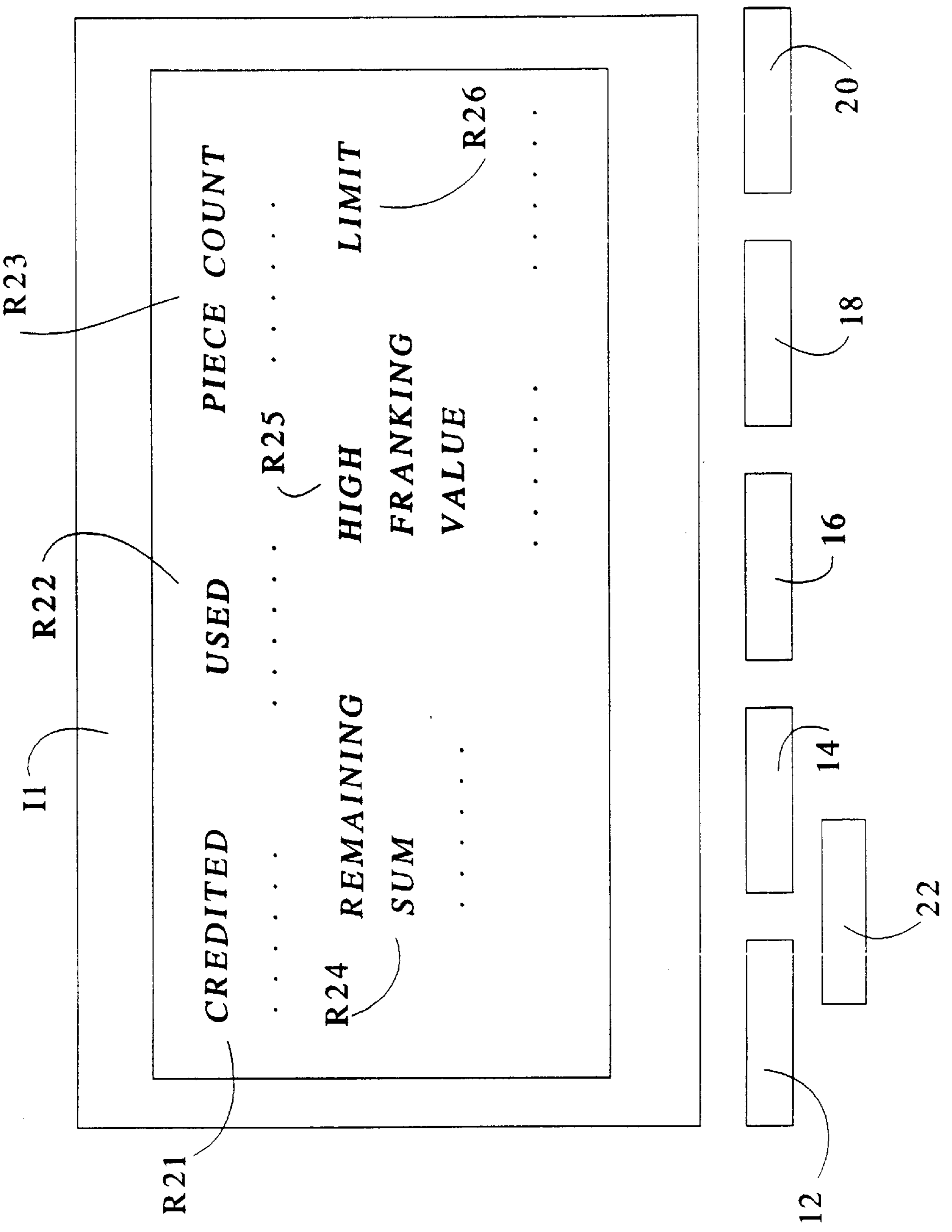
FIGS. 10, 11 and 12 respectively show information menu images for displaying explanatory information in the inventive interface.
Figure 11:
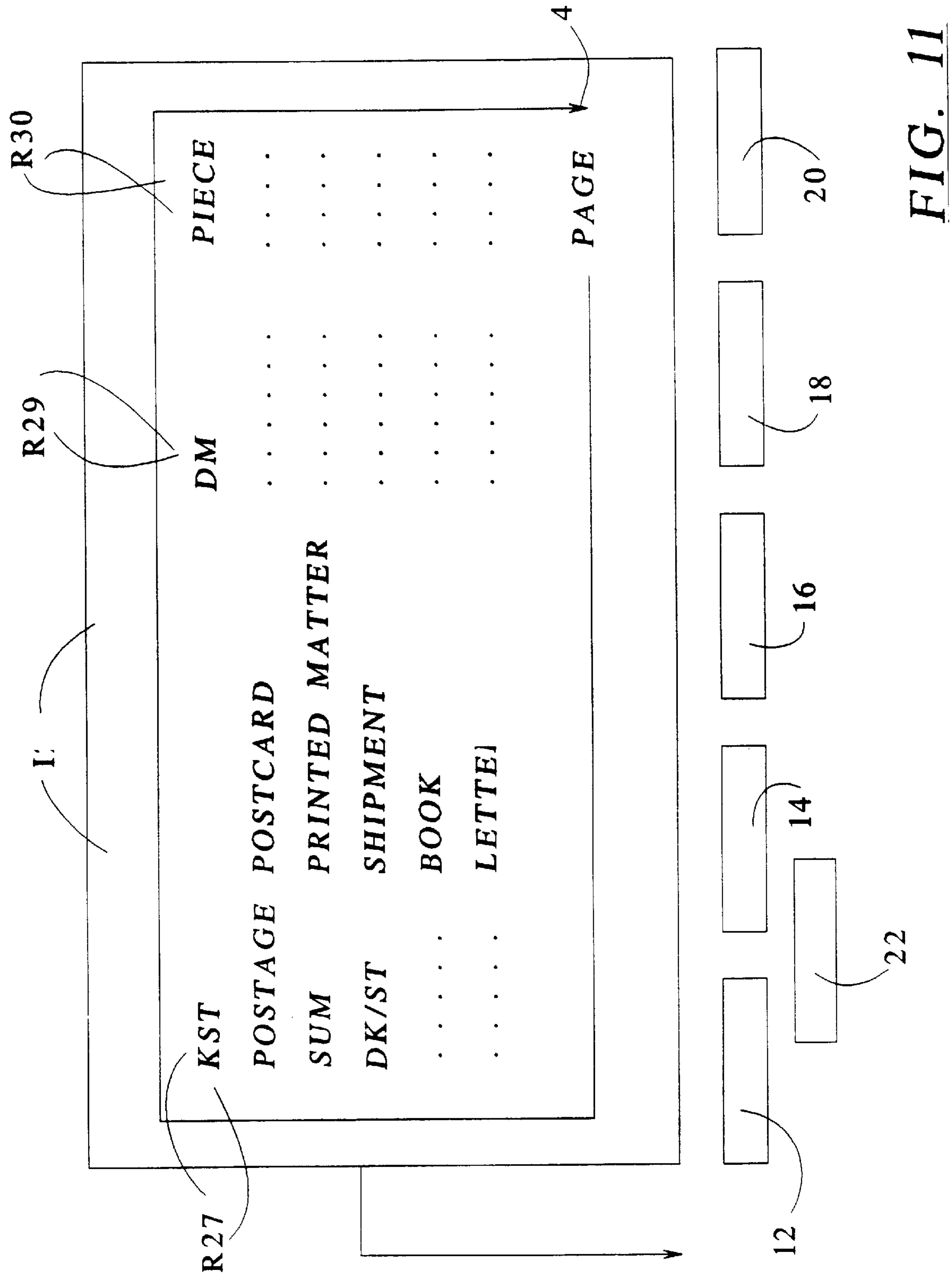
Figure 12:
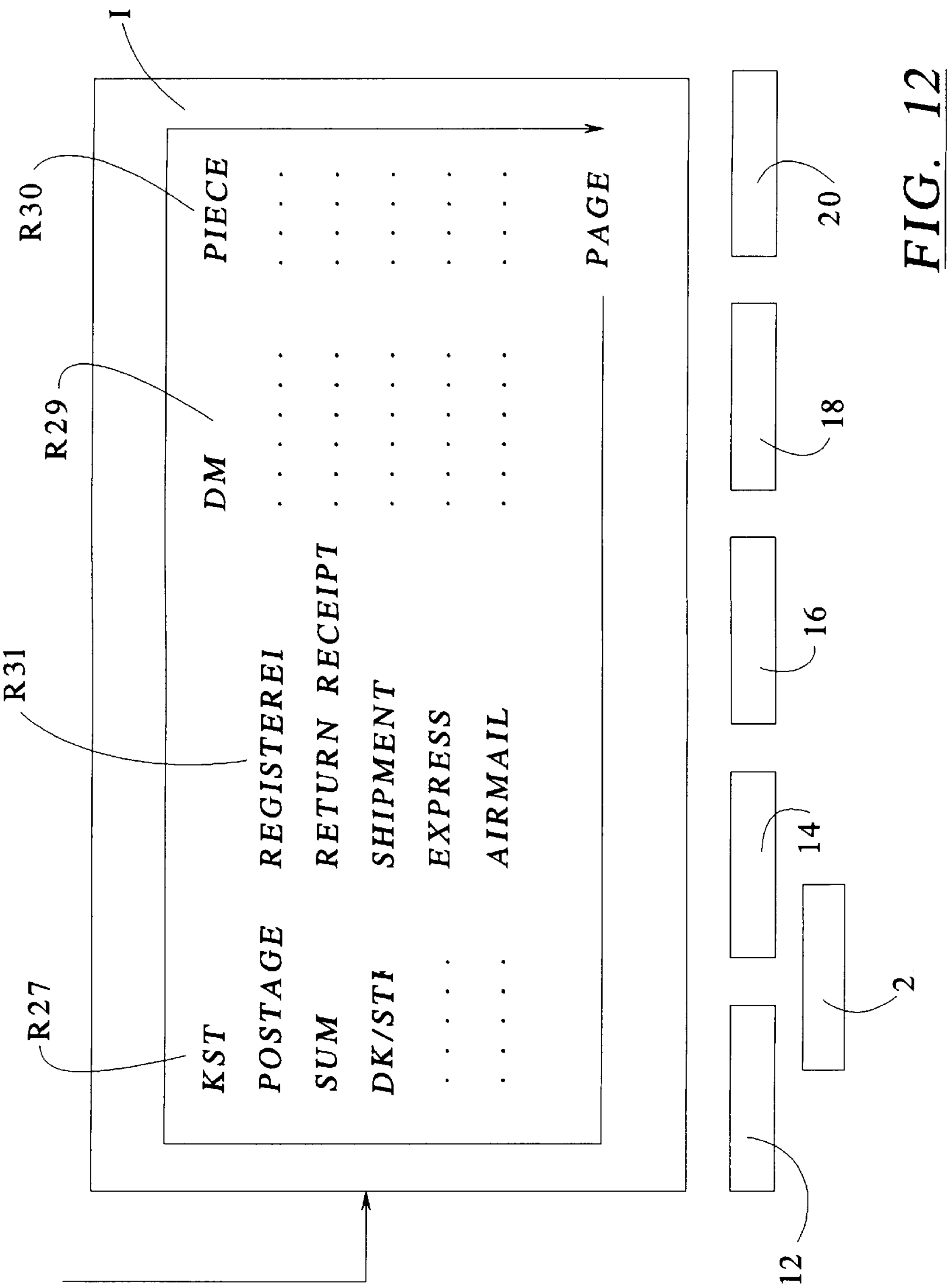

FIGS. 10–12 relate to information menu images 11, 12 and 13 that serve the purpose of informing the operator. The various information menu images 11, 12 and 13 only have display functions and do not serve the purpose of user prompting. The soft keys 12–22 therefore have no significance in conjunction with the information menu images.

In FIG. 10, the information menu image 11 indicates the current status of the various postage accounts. One proceeds to this information menu image from an arbitrary menu image M0–M4 by actuating the INFO key 30. The data of the current accounts are displayed in the various fields R21–R26.

FIG. 11 shows the information menu image 12 that indicates statistical data about the use in the fields R27–R30. The arrow 48 indicates that one can page through this information menu image 12, for example by repeated actuation of the INFO key 30 or of the scroll key 26. In this paging, a branch is made to the information menu image R3 that indicates further statistical information in the various fields R27–R31. A branch back to the initial menu image M0 can be made from the information menu images 11–13 by actuating the menu key 28.

Figure 13:
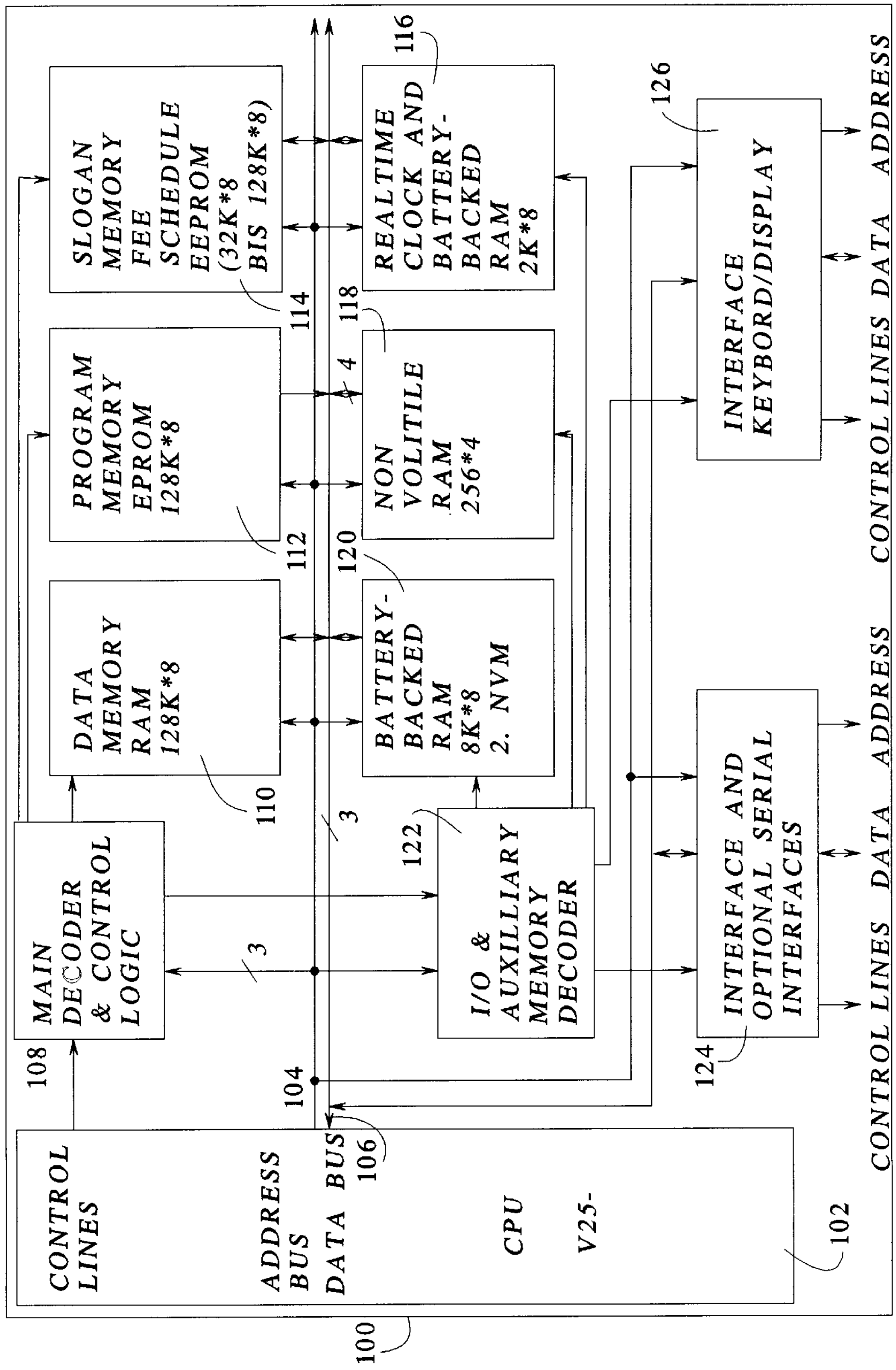
FIG. 13 is a block diagram of the control unit of a postage meter machine embodying the inventive user interface.

FIG. 13 shows the controller 100 of the postage meter machine in a block circuit diagram. The controller 100 contains a microprocessor 102 that is connected via a data bus 106 and an address bus 104 to a decoding unit 108, a main memory 110, a first non-volatile memory 112, a slogan memory 114, a clock module 116, a second non-volatile memory 120 fashioned as a battery-backed memory, a further decoding unit 122, an interface module 124 for external units and to an interface module 126 for the LCD display 10 and the above-described input means. The non-variable (constant) data for the menu images M0–M4 and 11–13 are stored in the first non-volatile memory 112 in the form of subprograms, this memory 112 also containing the control program for the microprocessor 102. The variable data for the aforementioned menu images are stored in the second non-volatile memory 120. Given outage of the power supply and restoration thereof, the variable data are again available.

Although modifications and changes may be suggested by those skilled in the art, it is the intention of the inventors to embody within the patent warranted hereon all changes and modifications as reasonably and properly come within the scope of their contribution to the art.

We claim as our invention:

1. A user interface for a postage meter machine comprising:

input means having a plurality of spatially positioned input elements for entering display and control information;

display means for displaying internally generated and externally entered information, said display means having a single display screen on which both said internally generated information and said externally entered information are visibly presented;

control means for controlling a plurality of functions of said postage meter machine and for controlling transfer of said information entered via said input means and for controlling display of said information on said display unit;

memory means in said control means containing a plurality of menu images subdivided into fields for display on said display unit, each of said fields having a field size defining a physical area of said field on said display screen associated therewith; and said controller means comprising means for selecting a menu image contained in said memory means for presentation on said display unit as a displayed image with said fields spatially allocated to said input elements with all menu images being visibly presentable on said single display unit, and comprising means for selectively varying the respective field sizes of any of the fields in said menu images of said displayed image.

2. A user interface as claimed in claim 1 wherein said fields contain at least one of text elements or graphics elements and wherein said means for selectively varying comprises means for selectively varying the respective field sizes to accommodate any of said text elements or graphics elements in respective fields in said menu images of said displayed image.

3. A user interface as claimed in claim 1 wherein said controller means includes means for causing a franking imprint image to be printed containing text and graphics, and wherein said means for storing a plurality of menu images comprises means for storing a franking imprint menu image containing text and graphics disposed in a geometrical arrangement corresponding to said text and graphics in said franking imprint.

4. A user interface as claimed in claim 1 wherein at least some of said fields of said menu images contain an input request, and wherein said input elements include at least one soft key of said input means spatially permanently allocated to each said field containing an input request.

5. A user interface as claimed in claim 4 wherein each said field containing an input request contains an optical identifier identifying said soft key.

6. A user interface as claimed in claim 5 wherein said optical identifier has a surface centroid disposed along a direction of an orthogonal axis of said display screen substantially aligned with a surface centroid of said soft key.

7. A user interface as claimed in claim 1 wherein at least some of said menu images contain a field having an optical identifier comprising a bar presentation.

8. A user interface as claimed in claim 1 wherein at least some of said menu images contain a field having an optical identifier comprising edge elements for a text.

9. A user interface as claimed in claim 1 wherein said input elements include a soft key of said input means and wherein at least some of said menu images contain a field allocated to said soft key, and wherein said control means comprises means, upon depression of said soft key, for inverting a display of the field allocated to said soft key.

10. A user interface as claimed in claim 1 wherein said input elements include a soft key of said input means, wherein at least some of said menu images contain a field allocated to said soft key, and wherein said control means comprises means, after actuation of said soft key, for enabling scroll functions or toggle functions for entering information via said input means by actuating other input elements of said input means.

11. A user interface as claimed in claim 10 wherein said input means comprises a confirmation key as one of said input elements and a further soft key as another of said input elements, and wherein said control means comprises means for confirming said information entered with said other input elements upon actuation of said confirmation key and means for invalidating said information entered with said other input elements upon a changing of said menu image or by actuation of said further soft key.

12. A user interface as claimed in claim 1 wherein said input elements include a predetermined hard key, scroll function keys and numerical keys, and wherein said control means comprises means for displaying an initial memory image on said display screen by actuating said predetermined hard key and for branching to other menu images in said plurality of menu images by actuating at least one of said scroll function keys or said numerical keys.

13. A user interface as claimed in claim 1 wherein said memory means comprises a non-volatile memory, said non-volatile memory also comprising means for storing a control program for use by said control means for controlling said postage meter machine.

14. A user interface as claimed in claim 13 wherein said non-volatile memory comprises a read-only memory.

15. A user interface as claimed in claim 13 wherein said non-volatile memory comprises a first non-volatile memory, and said memory means comprising a second non-volatile memory, separate from said first non-volatile memory, for storing variable quantities for said menu images.

16. A user interface as claimed in claim 1 wherein said memory means contains a plurality of variable parameters displayable in a menu image and initially set, upon presentation of said menu image on said display screen, to a value corresponding to a most recently entered value entered via said input means.

17. A user interface as claimed in claim 1 wherein said memory means contains a plurality of variable parameters displayable in a menu image and initially set, upon presentation of said menu image on said display screen, to a value corresponding to a value permanently stored in said memory means.

18. A user interface as claimed in claim 1 wherein at least some of said menu images in said plurality of menu images have an associated information menu image containing explanatory text and graphics, and wherein said control means comprises means, upon actuation of one of said input elements for branching from a menu image in said displayed image to its associated information menu image.

19. A user interface as claimed in claim 1 wherein said display screen comprises a liquid crystal display module having picture elements arranged in a matrix.

20. A user interface as claimed in claim 19 wherein said LCD module contains a rectangular display field having a longer side, and wherein said input elements include a plurality of soft keys of said input means disposed parallel to and a distance from said longer side of said display field.

21. A user interface as claimed in claim 1 wherein said input elements include a setting key and a parameter retrieve key of said input means, and wherein said control means comprises means, upon actuation of said setting key, for activating a program for storing values entered via other of said input elements into said memory means given display of predetermined ones of said plurality of menu images, said control means storing said values in said memory means for retrieval upon actuation of said parameter retrieve key for controlling at least some of said functions of said postage meter machine dependent on said values.

* * * * *